Oct. 9, 1951 C. F. CLIFFORD 2,571,085
MAGNETIC ESCAPEMENT COUNTING AND LIKE MECHANISM
Filed July 16, 1949 2 Sheets-Sheet 1

Inventor
Cecil Frank Clifford
By John P. Chandler
his Attorney

Oct. 9, 1951  C. F. CLIFFORD  2,571,085
MAGNETIC ESCAPEMENT COUNTING AND LIKE MECHANISM
Filed July 16, 1949  2 Sheets-Sheet 2

Patented Oct. 9, 1951

2,571,085

UNITED STATES PATENT OFFICE 2,571,085

MAGNETIC ESCAPEMENT COUNTING AND LIKE MECHANISM

Cecil Frank Clifford, Bath, England

Application July 16, 1949, Serial No. 105,223
In Great Britain July 28, 1948

9 Claims. (Cl. 172—284)

This invention relates to escapement, counting and like mechanism for the inter-conversion of reciprocatory and rotary motions comprising a rotor adapted to drive or be driven by an oscillatory or reciprocating member through a "magnetic lock" consisting of magnetic force acting across one or more air gaps between relatively rotating and oscillating magnetic members one of which is of wavy shape and forms a wavy path corresponding to the locus of the geometric projection of a co-operating pole-face or pole-faces of the other member upon it during relative oscillation and rotation.

In the present specification there is described a construction in which the magnetic member of wavy shape has extensions at each wave peak along which the co-operating pole-face of the other member is guided at each end of the oscillatory movement to maintain the magnetic lock and from which it returns to the wavy path as the oscillatory member returns towards its mean position.

According to the present invention, the magnetic member of the wavy shape has extensions as described above and is so shaped as to attract the pole-face of the other member as it returns from the extension to the wavy path towards the portion of the wavy path which will give continued movement of the rotor in one direction of rotation.

In one form of the invention, the magnetic member that forms the wavy path is made wider or thicker on one side of each junction with an extension, so that the co-operating pole-face of the other member is deflected in the required direction by being attracted towards the wider or thicker part of the wavy path as it returns to the wavy path. In another form of the invention, the same result is achieved by constructing the member that forms the wavy path so that the length of the air gap between it and the co-operating pole-face of the other member is shorter on one side of the junction with the extension than on the other side.

The nature of the invention and the manner in which the same is to be performed will be understood from the following more detailed description of some examples of constructions according to the invention, reference being made to the accompanying drawings in which.

Figure 1:
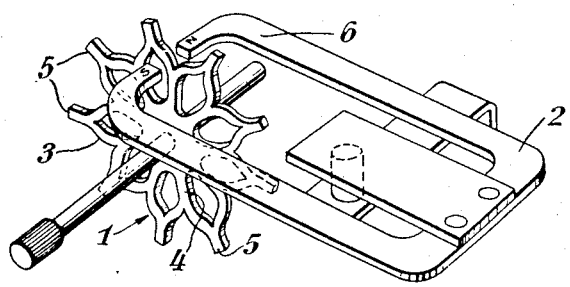
Figure 1 is a perspective view showing the essential working parts of an electric driving mechanism for a counter, synchronous clock or the like constructed according to the invention.

The mechanism shown in Figure 1 comprises a rotor 1 and a vibratory or oscillatory device 2 which has a to-and-fro movement in a direction radial to the axis of the rotor. In the construction shown, the oscillatory device is a reed and is adapted to be energised electrically so as to cause it to vibrate as described in the specification of our co-pending application for patent above referred to.

The rotor is in the form of a wheel or disk having a rim made of highly permeable magnetic material shaped to form an endless magnetic path or track 3 of wavy or zig-zag form as viewed axially of the wheel. It is formed with radial extensions 4 and 5 joined to the wavy path at the peaks of the waves. The extensions 4 joined to the peaks of the waves on the inner side may conveniently take the form of spokes by which the rim is attached to the hub of the wheel, whilst the extensions 5 at the outer side have free outer ends.

The vibratory or oscillatory device 2 carries a magnet 6 having a pole-face projecting towards the wheel 1 so that there is a small air gap between the pole-face of the magnet and the rim of the wheel.

The arrangement is such that, as the wheel 1 rotates, the pole-face of the magnet tends to move along the wavy track 3 and the wheel thus imparts a vibratory movement to the magnet 6 by reason of the magnetic attraction between the magnet and the wheel rim, which constitutes a "magnetic lock." Conversely, when the magnet 6 vibrates, it tends to impart rotation to the wheel.

The movement of the oscillatory or vibratory device may be variable in amplitude, because the pole-piece of the magnet 6 can move further along each of the extensions 4 and 5 of the wavy path to accommodate an increased amplitude of oscillatory or vibratory movement without breaking the magnetic lock, and will return along the extension to the wavy part of the path as the vibratory or oscillatory device returns towards its mean position.

In order to ensure uni-directional rotation, the wheel 1 is adapted to attract the pole-face of the magnet 6 in the appropriate direction each time it returns from one of the extensions 4 and 5 to the wavy path 3. For this purpose, the wavy path is made unsymmetrical at the junctions between the wavy path and the extensions 4 and 5, so that it has a wider part 7 on one side of each junction and a narrower part 8 on the other side of the junction, the wider part 7 being in the path that the magnet should take relatively to the rotor, corresponding to the required direction of rotation of the rotor. The magnet is attracted towards the wider part 7 of the two paths presented to it, and is thus deflected (relatively to the rotor) so as to ensure uni-directional rotation of the rotor in the direction shown by the arrow in Figure 2.

Figure 2:
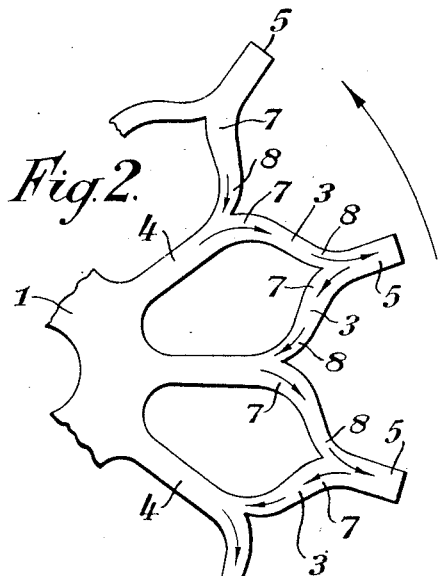
Figure 2 is an enlarged fragmentary view of the rotor of the mechanism shown in Figure 1.

In the operation of the mechanism shown in Figures 1 and 2, reciprocation or oscillation of the magnet 6, causes the rotor 1 to rotate through the space of one undulation of the wavy path for each alternate movement of the part carrying the magnet. Owing to the shape of the junctions between the wavy path and its extensions the movement is always in the same direction of rotation of the rotor.

The mechanism may also be operated as an escapement, for instance by driving the rotor by means of a spring or weight, its movement being controlled by the oscillation or vibration of the reed 2 or by a pendulum, or other oscillatory or vibratory device carrying the magnet 6. When the mechanism is used as an escapement, the shape of the junctions between the wavy path and its extensions (as described with reference to Figure 2) improves the action and allows the mechanism to operate effectvely with a lower driving torque than would be needed if the wavy path were symmetrically arranged.

Figure 3:
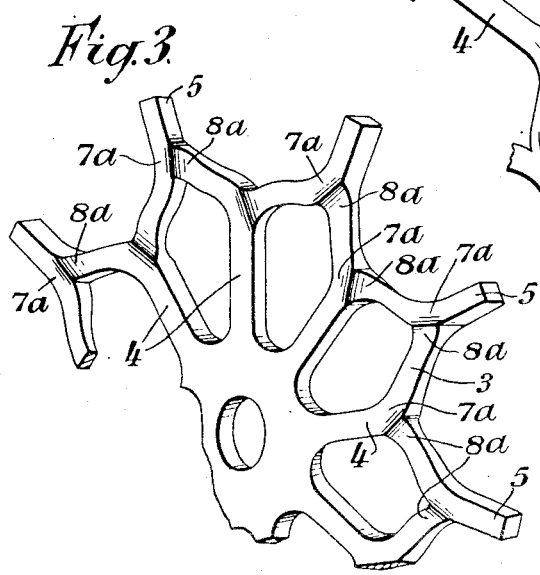
Figure 3 is a view similar to Figure 2 showing a modified construction of rotor.

Figure 3 of the drawings shows a modified construction of the rotor in which the portions 7a of the wavy path adjacent the junctions of the extensions 4 and 5 are made thicker than the portions 8a on the other side of the junction. The difference in thickness of the parts 7a and 8a has the same effect as the difference in width between the parts 7 and 8 shown in Figure 2. The magnet 6 is attracted towards the thicker parts 7a as it returns from each of the extensions 4 and 5 to the wavy path, and the rotor therefore rotates in the direction of the arrow shown in Figure 3.

It will be evident that the rotor could be constructed in other ways so as to obtain the required bias tending to deflect the magnet in the appropriate direction (relatively to the rotor) corresponding to the required direction of rotation of the rotor. For instance, a rotor made of material of uniform thickness could be embossed so that the portion of the wavy path on one side of each junction is raised somewhat, with the result that the air gap between the rotor and the magnet 6 when the raised portion of the wavy path is brought into alignment with the magnet is shorter than the air gap formed when the portion of the path on the other side of the junction is brought into line with the magnet. As the magnet returns to the wavy path from each of the extensions thereof, it is attracted towards the portion of the path that forms the shorter air-gap. The rotor is thus constrained to rotate in the required direction.

The variations in the length of the air gap (or, in the constructions described with reference to Figures 1 and 2, the variations in the width or thickness of the material forming the wavy track) have the effect of varying the energy stored in the gap, the stored energy being alternatively increased and diminished during the rotation of the rotor. Each increase of energy (due to increase in the length of the gap or to a decrease in the width or thickness of the active portion of the wavy path) is arranged to occur at a time when the pole-face of the magnet that co-operates with the wavy path is moving along a part of the path from which it cannot escape. The energy stored up in this way is utilised to deflect the magnet in the required direction relatively to the wavy path when it reaches a junction on its return to the wavy path from one of the extensions thereof.

The arrangement of the mechanism as shown in Figure 1 is capable of considerable modification. For instance, the wavy magnetic path might be formed on a magnetic element carried by the vibratory or oscillatory device and adapted to co-operate with a magnet on the rotor. The wavy path need not be endless, but might extend over a finite number of wave lengths and be arranged to co-operate with a series of pole pieces on the rotor which move successively into its range as the rotor rotates.

The magnetic element that forms the wavy path, or the element that co-operates with it, or both elements, may be permanently magnetised. Alternatively none of the magnetic elements need be permanently magnetised but may be polarised by means of a magnetising coil or external magnet. Parts not permanently magnetised but subjected to fluctuating fluxes may be made of a low-loss magnetic material such as that known by the registered trademark "Mumetal."

Figure 4:
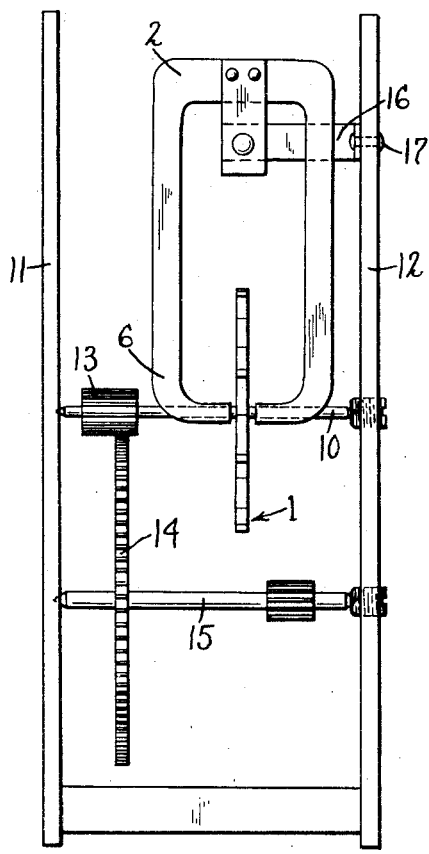
Fig. 4 is an elevational view showing in conventional form the essential features of a motor embodying my invention.

A conventional form of motor embodying the oscillatory device 2 is shown in Fig. 4 of the drawings wherein the rotor 1 is mounted upon a shaft 10 supported in frame plates 11 and 12. Upon the rotor shaft may be mounted a driving pinion 13 meshing with a driven gear 14 mounted upon a driven shaft 15 also rotatably carried in end bearings on the plates 11 and 12. The vibratory device, which may be vibrated in any convenient manner, is supported by an arm 16 secured at 17 to one of the side plates 12 so that the pole pieces of the magnet 6 are supported adjacent the rim portion of the rotor 1, one upon each side thereof. It will be apparent that if a vibratory movement is imparted to the member 2, the movement of the pole pieces of the magnet 6 will, due to the construction of the rotor 1, cause rotary movement thereof and the shaft 10 by virtue of the intermeshing of the pinion 13 and gear 14 will drive the shaft 15.

Figure 5:
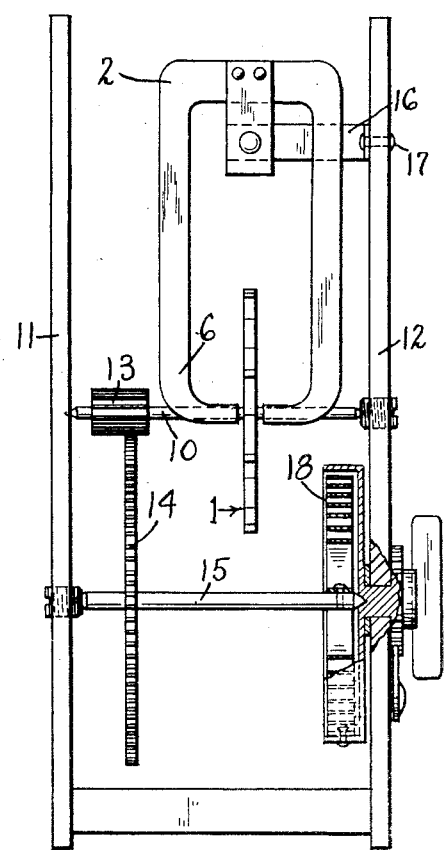
Fig. 5 is a view similar to Fig. 4 showing a conventional form of spring-driven motor with which the oscillating member cooperates.

In Fig. 5 of the drawings, the mechanism shown is similar to that just described in Fig. 4 except that the shaft 15 is illustrated as being driven and the vibratory device 2 acts as an escapement to control the speed of rotation of this shaft. As shown a conventional spring motor 18 is carried by the plate 12, which motor drives the shaft 15 and, through the gear 14 and pinion 13, also drives the rotor shaft 10.

I claim:

1. A motor mechanism comprising a rotor, an oscillating member cooperating with the rotor member to effect a "magnetic lock" consisting of magnetic force acting across one or more air gaps between said members, said rotor comprising a magnet member of wavy shape forming a wavy path corresponding substantially to the locus of the geometric projection of a co-operating pole-face or pole-faces of the other member upon it during relative rotation and oscillation, the member of wavy shape having extensions at each wave peak along which the co-operating pole-face of the other member is guided at each end of the oscillating movement to maintain the "magnetic lock" and from which it returns to the wavy path as the oscillating member returns towards its mean position, said member of wavy shape having greater attraction for said other member on one side of said extension than on the other side.

2. Mechanism according to claim 1 wherein the magnetic member that forms the wavy path is made relatively wide on one side of each junction with an extension and relatively narrow on the other side of the junction so that the co-operating pole-face of the other member is deflected relatively to the rotor in the required direction by being attracted towards the wider part of the wavy path as it returns to the wavy path.

3. Mechanism according to claim 1 wherein the magnetic member that forms the wavy path is made relatively thick on one side of each junction with an extension and relatively thin on the other side of the junction, so that the co-operating pole-face of the other member is deflected relatively to the rotor in the required direction by being attracted towards the thicker part of the wavy path as it returns to the wavy path.

4. Mechanism according to claim 1, wherein the magnetic member that forms the wavy path is constructed so that the air gap between the rotor and the magnet is relatively short when a portion of the wavy path immediately adjacent a junction on one side of the junction is brought into alignment with the magnet and is relatively long when a portion of the wavy path immediately adjacent the other side of the junction is brought into alignment with the magnet.

5. A magnetic escapement mechanism comprising an operatively mounted vibratory member having a natural frequency of vibration, said member carrying a pair of magnetic poles of opposite polarity arranged to face each other across an air gap and an escape wheel having a continuous wavy magnetic path of low-hysteresis-loss metal formed at its periphery, the wheel being mounted for rotation about an axis perpendicular to the movement of the vibrator, the edge of the wheel projecting between the poles so that the wavy magnetic path is substantially the geometric projection of the magnetic poles upon the wheel during relative rotation and vibration of the wheel and vibratory member, said wavy magnetic path having extensions on the apices thereof so that the magnetic poles are able to follow the wavy path over a wider range of amplitude of vibration.

6. In a motor mechanism, an operatively mounted rotor member and an oscillating member mounted adjacent thereto, said rotor comprising a magnetic member of wavy shape adjacent its periphery, said oscillating member having a pole face adjacent said magnetic member, said member of wavy shape forming a wavy path corresponding substantially to the geometric projection of the pole face during rotation and oscillation of said members, respectively, the member of wavy shape having extensions at each wave peak along which said pole face of the oscillating member is guided at each end of the oscillating movement thereof to maintain a magnetic lock between said members and from which extensions the pole returns to the wavy path as the oscillating member approaches its mean position.

7. A motor mechanism as in claim 6 wherein said wavy magnetic member has, upon one side of said extension, a dimension greater than that on the other side of said extension whereby the oscillating member when returning from one of said extensions will be attracted more strongly toward one side of said extension than the other side.

8. In a motor or like mechanism an operatively mounted rotor, a vibratory member having a natural period of vibration there being at least one polar formation on said vibratory member, means providing a continuous wavy magnetic path on said rotor, said path substantially conforming to the locus of the geometric projection of said polar formation upon the rotor during rotation and vibration of said members respectively, one of said members being magnetized, and said rotor having extensions at the apices of said wavy magnetic path so that the polar formation on the vibratory member will follow the wavy path over a wider amplitude of vibration.

9. A motor or like mechanism as in claim 8 wherein said wavy path is provided with means upon one side of each of said extensions to more strongly attract the polar formation to that side upon its return from said extension.

CECIL FRANK CLIFFORD.

REFERENCES CITED

The following references are of record in the file of this patent:

UNITED STATES PATENTS

| Number | Name | Date |
|---|---|---|
| 1,277,371 | Boyle | Sept. 3, 1918 |
| 1,693,314 | Murphy | Nov. 27, 1928 |
| 1,788,065 | O'Neil | Jan. 6, 1931 |
| 1,825,382 | Baker | Sept. 29, 1931 |